US009478823B2

(12) United States Patent
Lee et al.

(10) Patent No.: US 9,478,823 B2
(45) Date of Patent: Oct. 25, 2016

(54) SECONDARY BATTERY

(71) Applicant: Samsung SDI Co., Ltd., Yongin-si, Gyeonggi-do (KR)

(72) Inventors: Hye-Jung Lee, Yongin-si (KR); Bong-Kyoung Park, Yongin-si (KR); Feygenson Naum, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 347 days.

(21) Appl. No.: 14/280,439

(22) Filed: May 16, 2014

(65) Prior Publication Data

US 2015/0086820 A1 Mar. 26, 2015

(30) Foreign Application Priority Data

Sep. 24, 2013 (KR) ........................ 10-2013-0113458

(51) Int. Cl.
*H01M 10/04* (2006.01)
*H01M 2/02* (2006.01)
*H01M 2/32* (2006.01)
*H01M 2/20* (2006.01)

(52) U.S. Cl.
CPC ..... *H01M 10/0422* (2013.01); *H01M 10/0436* (2013.01); *H01M 2/02* (2013.01); *H01M 2/20* (2013.01)

(58) Field of Classification Search
CPC ........... H01M 10/04; H01M 10/0422; H01M 10/0436; H01M 2/02; H01M 2/32; H01M 2/20; H01M 2/22
See application file for complete search history.

(56) References Cited

U.S. PATENT DOCUMENTS

| 6,599,659 | B1 | 7/2003 | Endo et al. | |
| 2004/0072072 | A1* | 4/2004 | Suzuki | C01G 45/1221 429/231.1 |
| 2004/0175611 | A1 | 9/2004 | Otohata et al. | |
| 2007/0015060 | A1* | 1/2007 | Klaassen | H01B 1/122 429/309 |
| 2008/0292966 | A1* | 11/2008 | Bak | H01M 2/1646 429/246 |
| 2009/0047580 | A1* | 2/2009 | Takagi | H01M 2/14 429/246 |
| 2009/0229114 | A1* | 9/2009 | Kimura | H01G 9/016 29/623.1 |
| 2010/0310924 | A1* | 12/2010 | Kaneda | H01M 4/13 429/163 |
| 2011/0117417 | A1 | 5/2011 | Pitts | |
| 2013/0295431 | A1 | 11/2013 | Kwon et al. | |

FOREIGN PATENT DOCUMENTS

| KR | 2000-0064499 A | 11/2000 |
| KR | 2002-0017973 A | 3/2002 |

(Continued)

*Primary Examiner* — Kenneth Douyette
(74) *Attorney, Agent, or Firm* — Lewis Roca Rothgerber Christie LLP

(57) ABSTRACT

A secondary battery includes: a case; and an electrode assembly accommodated in the case and including a positive electrode plate, a negative electrode plate, and a separator between the positive and negative electrode plates. At least one of the positive and negative electrode plates includes: a first sub-electrode plate including a first coating surface coated with an active material and a first non-coating surface facing oppositely away from the first coating surface and not coated with the active material; and a second sub-electrode plate including a second coating surface coated with an active material and a second non-coating surface facing oppositely away from the second coating surface and not coated with the active material. The first non-coating surface of the first sub-electrode plate faces the second non-coating surface of the second sub-electrode plate to allow the first and the second sub-electrode plates to slip relative to each other.

20 Claims, 6 Drawing Sheets

(56) References Cited

FOREIGN PATENT DOCUMENTS

| | | |
|---|---|---|
| KR | 10-2004-0078553 A | 9/2004 |
| KR | 10-2010-0137430 A | 12/2010 |
| KR | 10-2012-0052644 A | 5/2012 |
| WO | WO 97/22466 A | 6/1997 |

* cited by examiner

SECONDARY BATTERY

CROSS-REFERENCE TO RELATED APPLICATION

This application claims priority to and the benefit of Korean Patent Application No. 10-2013-0113458, filed on Sep. 24, 2013, in the Korean Intellectual Property Office, the disclosure of which is incorporated herein in its entirety by reference.

BACKGROUND

1. Field

One or more embodiments of the present invention relate to a secondary battery.

2. Description of the Related Art

Unlike primary batteries, secondary batteries are rechargeable, and the use of secondary batteries is encouraged due to their economical and eco-friendly aspects. Recently, various electronic devices started utilizing secondary batteries, and designs of such electronic devices became an important factor in making purchasing decisions.

For example, technology of various wearable computers using secondary batteries as power sources has been developed, and application examples thereof have been introduced. In addition, current electronic devices such as cellular phones and laptop computers are ergonomically designed to have curved surfaces.

Therefore, secondary batteries used in such electronic devices as power sources may also need to have variously bendable or deformable features capable of conforming to the shapes of the electronic devices.

SUMMARY

One or more aspects of embodiments of the present invention are directed towards a flexible secondary battery.

Additional aspects will be set forth in part in the description which follows and, in part, will be apparent from the description, or may be learned by practice of the presented embodiments.

According to one or more embodiments of the present invention, a secondary battery includes a case; and an electrode assembly accommodated in the case and including a positive electrode plate, a negative electrode plate, and a separator between the positive and negative electrode plates. At least one of the positive and negative electrode plates includes a first sub-electrode plate including a first coating surface coated with an active material and a first non-coating surface facing oppositely away from (or opposite to) the first coating surface and not coated with the active material; and a second sub-electrode plate including a second coating surface coated with an active material and a second non-coating surface facing oppositely away from (or opposite to) the second coating surface and not coated with the active material. The first non-coating surface of the first sub-electrode plate faces the second non-coating surface of the second sub-electrode plate.

At least one of the first and second non-coating surfaces may be mirror polished.

A liquid electrolyte may be further included.

The liquid electrolyte may be disposed in a gap between the first and second non-coating surfaces.

At least one of the first and second non-coating surfaces may include a concave portion accommodating the liquid electrolyte.

A coating layer may be formed on at least one of the first and second non-coating surfaces.

The coating layer may include a fluorinated polymer.

The separator may be formed of a solid electrolyte.

A liquid lubricant disposed in a gap between the first and second non-coating surfaces may be further included.

According to one or more embodiments of the present invention, a secondary battery includes a case; and an electrode assembly accommodated in the case, the electrode assembly including a positive electrode plate, a negative electrode plate, and a separator between the positive and negative electrode plates. At least one of the positive and negative electrode plates includes a first sub-electrode plate including a first sub-collector and an active material, the first sub-collector including a first surface coated with the active material and a second surface opposite to the first surface; and a second sub-electrode plate including a second sub-collector and an active material, the second sub-collector including a third surface coated with the active material and a fourth surface opposite to the third surface. The second surface of the first sub-collector faces the fourth surface of the second sub-collector.

Roughness of the first surface may be greater than roughness of the second surface.

Roughness of the third surface may be greater than roughness of the fourth surface.

A liquid electrolyte accommodated in the case may be further included.

At least one of the second surface of the first sub-collector and the fourth surface of the second sub-collector may include at least one concave portion accommodating the electrolyte.

A coating layer formed on at least one of the second surface of the first sub-collector and the fourth surface of the second sub-collector may be further included.

The second surface of the first sub-collector and the fourth surface of the second sub-collector may slip relative to each other.

The separator may be formed of a solid electrolyte.

A liquid lubricant disposed in a gap between the second surface of the first sub-collector and the fourth surface of the second sub-collector may be further included.

The electrode assembly may be a stack type electrode assembly in which the positive electrode plate, the separator, and the negative electrode plate are sequentially stacked.

The electrode assembly may be a jelly-roll type electrode assembly in which the positive electrode plate, the separator, and the negative electrode plate are sequentially stacked and wound.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
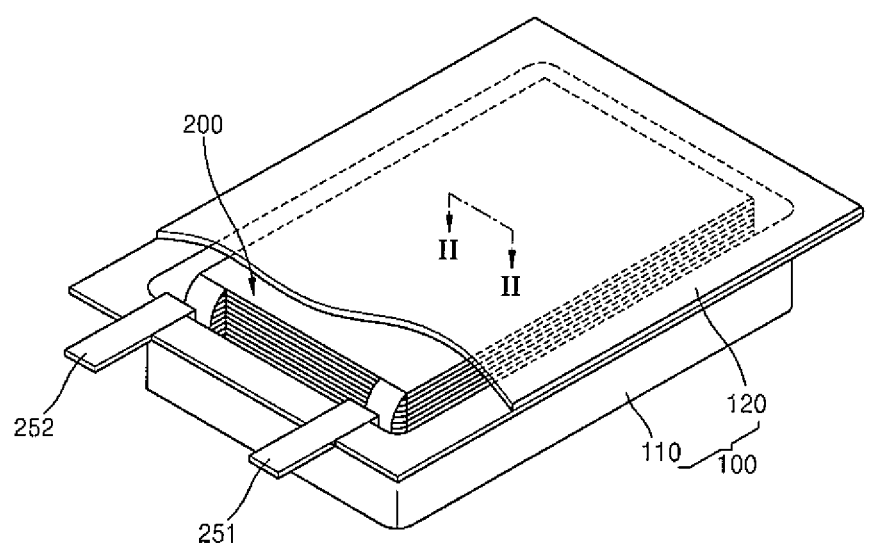
FIG. 1 is a schematic perspective view illustrating a battery pack according to an embodiment of the present invention.

Reference will now be made in detail to embodiments, examples of which are illustrated in the accompanying drawings. Effects and features of the embodiments, and implementation methods thereof will be clarified through the following descriptions given with reference to the accompanying drawings In this regard, the embodiments may have different forms and should not be construed as being limited to the descriptions set forth herein.

Hereinafter, the embodiments of the present invention will be described in detail with reference to the accompanying drawings. In the drawings, like reference numerals denote like elements, and overlapping descriptions thereof will be omitted.

In the following descriptions of the embodiments, although the terms "first" and "second" are used to describe various elements, these elements should not be limited by these terms. These terms are only used to distinguish one element from another element.

In the following descriptions of the embodiments, the terms of a singular form may include plural forms unless referred to the contrary.

In the following descriptions of the embodiments, the meaning of "include," "comprise," "including," or "comprising," specifies a property, a region, a fixed number, a step, a process, an element and/or a component but does not exclude other properties, regions, fixed numbers, steps, processes, or elements.

It will be understood that when a film, a region, or an element is referred to as being "above" or "on" another film, region, or element, it can be directly on the other film, region, or element, or intervening films, regions, or elements may also be present.

In the drawings, the sizes of elements may be exaggerated for clarity. For example, in the drawings, the size or thickness of each element may be arbitrarily shown for illustrative purpose, and thus the present invention should not be construed as being limited thereto.

Expressions such as "at least one of," when preceding a list of elements, modify the entire list of elements and do not modify the individual elements of the list. Further, the use of "may" when describing embodiments of the present invention refers to "one or more embodiments of the present invention."

FIG. 1 is a schematic perspective view illustrating a battery pack according to an embodiment of the present invention.

Referring to FIG. 1, the secondary battery includes a case 100 and an electrode assembly 200 disposed in the case 100.

The case 100 may include a lower case 110 accommodating the electrode assembly 200 and an upper case 120 covering the lower case 110. The upper case 120 and the lower case 110 may be bonded together along edges thereof to seal the electrode assembly 200.

The case 100 may be a pouch case having flexiblity. When the case 100 is flexible, sealing of the case 100 may be prevented from breaking due to a force bending or curving the secondary battery.

The case 100 may have a multi-layer structure in which a thermal fusion layer capable of being thermally fused to function as a sealing material, a metal layer providing mechanical strength and blocking moisture and oxygen, and an insulation layer are sequentially stacked. The upper case 120 and the lower case 110 may be bonded together by placing the thermal fusion layers of the lower case 110 and the upper case 120 to face each other, and thermally fusing edges of the thermal fusion layers.

The electrode assembly 200 may include a positive electrode plate 210, a negative electrode plate 220, and a separator 230 disposed therebetween. For example, the electrode assembly 200 may be formed by sequentially stacking the positive electrode plate 210, the separator 230, and the negative electrode plate 220. The electrode assembly 200 may be charged and discharged through a positive electrode tab 251 extending from the positive electrode plate 210 and a negative electrode tab 252 extending from the negative electrode plate 220.

Each of the positive electrode plate 210 and the negative electrode plate 220 may include first and second sub-electrode plates. The first sub-electrode plate may include a first sub-collector and may be formed by coating one surface of the first sub-collector with an active material, and the second sub-electrode plate may include a second sub-collector and may be formed by coating one surface of the second sub-collector with an active material. Non-coating surfaces of the first and second sub-electrode plates, that is, non-coating surfaces of the first and second sub-collectors not coated with an active material, are disposed to face each other and slip relative to each other. Therefore, when a force is applied to bend or curve the secondary battery, the electrode assembly 200 may be easily deformed and may be prevented from breaking and from deterioration of electric characteristics of the secondary battery.

Hereinafter, the structures of the positive electrode plate 210 and the negative electrode plate 220 will be described in more detail with reference to FIGS. 2 to 4.

In the following description, the first and second sub-electrode plates of the positive electrode plate 210 are referred to as first and second sub-positive electrode plates 210a and 210b, and the first and second sub-electrode plates of the negative electrode plate 220 are referred to as first and second sub-negative electrode plates 220a and 220b. In the following description, the first sub-collector of the first sub-positive electrode plate 210a is referred to as a first positive electrode collector 211a, and the second sub-collector of the second sub-positive electrode plate 210b is referred to as a second positive electrode collector 211b. In addition, active materials coated on the first and second positive electrode collectors 211a and 211b are referred to as first and second positive electrode active materials 212a and 212b. Similarly, in the following description, the first sub-collector of the first sub-negative electrode plate 220a is referred to as a first negative electrode collector 221a, and the second sub-collector of the second sub-negative electrode plate 220b is referred to as a second negative electrode collector 221b. In addition, active materials coated on the first and second negative electrode collectors 221a and 221b are referred to as first and second negative electrode active materials 222a and 222b.

Figure 2:
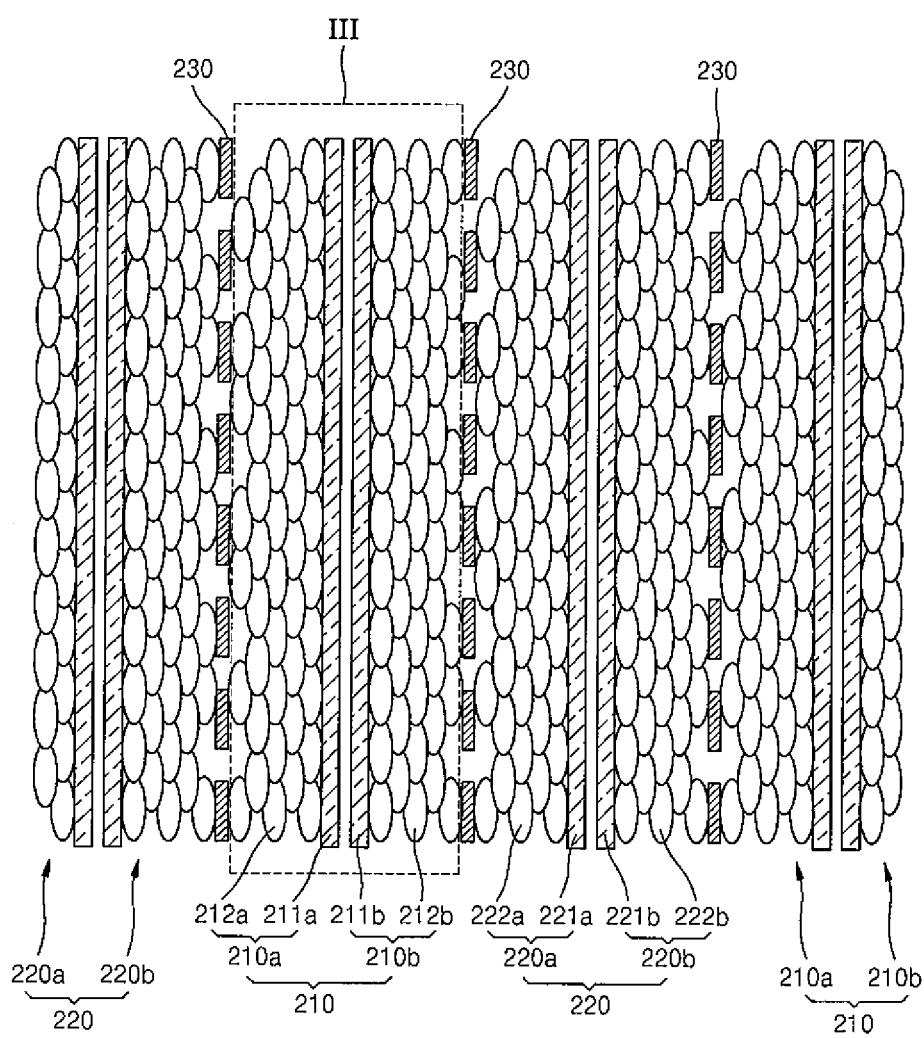
FIG. 2 is a cross-sectional view taken along line II-II of FIG. 1.
Figure 3:
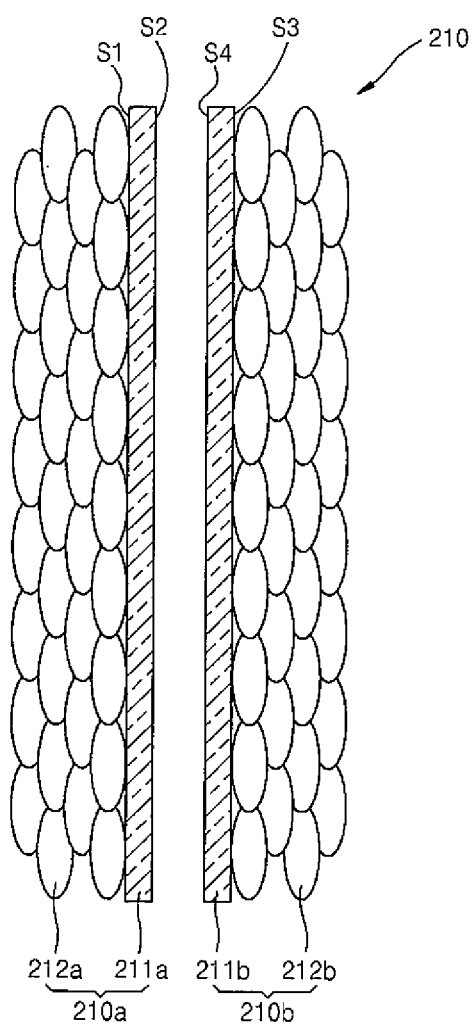
FIG. 3 is an enlarged view illustrating portion III of FIG. 2.

FIG. 2 is a cross-sectional view taken along line II-II of FIG. 1 to illustrate the structure of the electrode assembly 200, and FIG. 3 is an enlarged view illustrating portion III of FIG. 2. FIG. 4 is a view illustrating the first and second sub-positive electrode plates 210a and 210b slipping relative to each other due to a force bending or curving the secondary battery.

Referring to FIGS. 2 and 3, the positive electrode plate 210 may include the first sub-positive electrode plate 210a and the second sub-positive electrode plate 210b. The first sub-positive electrode plate 210a includes: the first positive electrode collector 211a; and the first positive electrode active material 212a coated on a first surface S1 of the first positive electrode collector 211a. The second sub-positive electrode plate 210b includes: the second positive electrode collector 211b; and the second positive electrode active material 212b coated on a third surface S3 of the second positive electrode collector 211b.

The first sub-positive electrode plate 210a and the second sub-positive electrode plate 210b may be manufactured by coating the first and second positive electrode active materials 212a and 212b onto the first and second positive electrode collectors 211a and 211b formed of a material such as a thin aluminum film. To improve coating property of the first and second positive electrode active materials 212a and 212b, the roughness of the first surface S1 of the first positive electrode collector 211a may be greater than that of a second surface S2 of the first positive electrode collector 211a, and the roughness of the third surface S3 of the second positive electrode collector 211b may be greater than that of a fourth surface S4 of the second positive electrode collector 211b.

Each of the first and second positive electrode active materials 212a and 212b is only coated onto one surface of each of the first and second positive electrode collectors 211a and 211b. That is, the first sub-positive electrode plate 210a may include a first coating surface onto which the first positive electrode active material 212a is coated and a first non-coating surface onto which the first positive electrode active material 212a is not coated, and the second sub-positive electrode plate 210b may include a second coating surface onto which the second positive electrode active material 212b is coated and a second non-coating surface onto which the second positive electrode active material 212b is not coated.

For example, lithium-containing transition metal oxides such as $LiCoO_2$, $LiNiO_2$, $LiMnO_2$, or $LiMnO_4$, or lithium chalcogenides may be used as the first and second positive electrode active materials 212a and 212b. However, the embodiments of the present invention are not limited thereto.

The first sub-positive electrode plate 210a and the second sub-positive electrode plate 210b may be arranged such that the non-coating surfaces of the first sub-positive electrode plate 210a and the second sub-positive electrode plate 210b face each other. For example, the second surface S2 of the first positive electrode collector 211a may face the fourth surface S4 of the second positive electrode collector 211b.

Since a gap is formed between the second surface S2 of the first positive electrode collector 211a and the fourth surface S4 of the second positive electrode collector 211b without any physical coupling therebetween, the first and second sub-positive electrode plates 210a and 210b may slip relative to each other.

Figure 4:
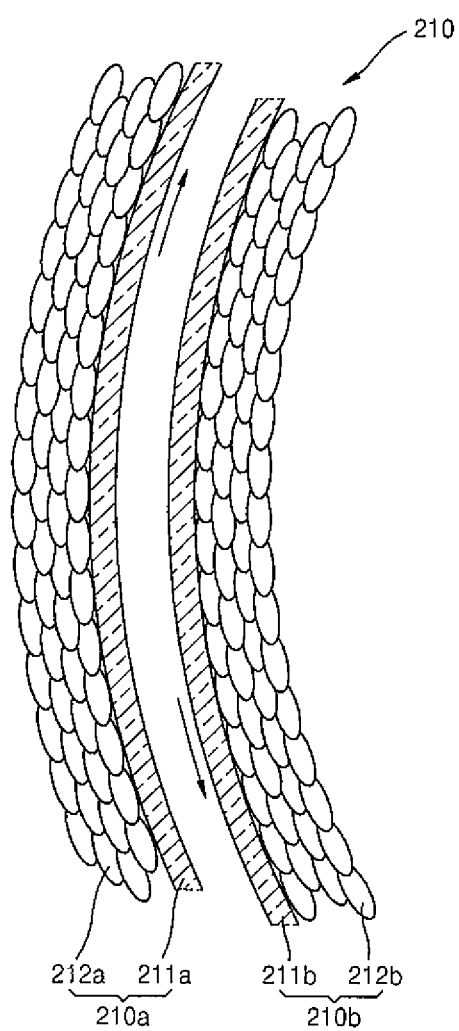
FIG. 4 is a view illustrating first and second sub-positive electrode plates slipping relative to each other due to a force bending or curving the secondary battery.

As shown in FIGS. 3 and 4, the first sub-positive electrode plate 210a and the second sub-positive electrode plate 210b may slip in different directions (e.g. opposite directions). Therefore, when a force is applied to bend or curve the secondary battery, the electrode assembly 200 may be easily deformed and may be prevented from breaking and from deterioration of its electric characteristics.

To facilitate (or improve) slipping between the first and second sub-positive electrode plates 210a and 210b, the non-coating surfaces of the first and second sub-positive electrode plates 210a and 210b, that is, the second and fourth surfaces S2 and S4 of the first and second positive electrode collectors 211a and 211b may be mirror polished.

Referring to back FIG. 2, the negative electrode plate 220 may include the first sub-negative electrode plate 220a and the second sub-negative electrode plate 220b. The first sub-negative electrode plate 220a includes the first negative electrode collector 221a and the first negative electrode active material 222a coated on a first surface of the first negative electrode collector 221a. The second sub-negative electrode plate 220b includes the second negative electrode collector 221b and the second negative electrode active material 222b coated on a third surface of the second negative electrode collector 221b.

The first sub-negative electrode plate 220a and the second sub-negative electrode plate 220b may be manufactured by respectively coating the first and second negative electrode active materials 222a and 222b onto the first and second negative electrode collectors 221a and 221b formed of a material such as a thin copper film. To improve coating property of the first and second negative electrode active materials 222a and 222b, the roughness of the first surface of the first negative electrode collector 221a may be greater than that of a second surface of the first negative electrode collector 221a, and the roughness of the third surface of the second negative electrode collector 221b may be greater than that of a fourth surface of the second negative electrode collector 221b.

Each of the first and second negative electrode active materials 222a and 222b is only coated onto one surface of each of the first and second negative electrode collectors 221a and 221b. That is, the first sub-negative electrode plate 220a may include a first coating surface onto which the first negative electrode active material 222a is coated and a first non-coating surface onto which the first negative electrode active material 222a is not coated, and the second sub-negative electrode plate 220b may include a second coating surface onto which the second negative electrode active material 222b is coated and a second non-coating surface onto which the second negative electrode active material 222b is not coated.

For example, carbon materials such as crystalline carbon, amorphous carbon, carbon composites, or carbon fibers, lithium metal, or lithium alloys may be used as the first and second negative electrode active materials 222a and 222b. However, the embodiments of the present invention are not limited thereto.

The non-coating surfaces of the first sub-negative electrode plate 220a and the second sub-negative electrode plate 220b may face each other. For example, the second surface of the first negative electrode collector 221a onto which the first negative electrode active material 222a is not coated may face the fourth surface of the second negative electrode collector 221b onto which the second negative electrode active material 222b is not coated.

Since a gap is formed between the second surface of the first negative electrode collector 221a and the fourth surface of the second negative electrode collector 221b without any physical coupling therebetween, the first and second sub-negative electrode plates 220a and 220b may slip relative to each other. For example, like the first and second sub-positive electrode plates 210a and 210b described above with reference to FIGS. 3 and 4, the first sub-negative electrode plate 220a and the second sub-negative electrode plate 220b may slip in different directions (e.g. opposite directions).

To facilitate (or improve) slipping between the first and second sub-negative electrode plates 220a and 220b, the non-coating surfaces of the first and second sub-negative electrode plates 220a and 220b, that is, the second and fourth surfaces of the first and second negative electrode collectors 221a and 221b, may be mirror polished.

As described above, the first and second sub-positive electrode plates 210a and 210b, and/or the first and second sub-negative electrode plates 220a and 220b may slip relative to each other. Therefore, as shown in FIG. 4, when a force is applied to bend or curve the secondary battery, the electrode assembly 200 may be easily deformed and may be prevented from breaking and from deterioration of its electric characteristics.

If the secondary battery includes a liquid electrolyte, the liquid electrolyte is disposed in the gap between the first and second sub-positive electrode plates 210a and 210b and/or the gap between the first and second sub-negative electrode plates 220a and 220b, and thus the slip between the first and second sub-positive electrode plates 210a and 210b and/or the slip between the first and second sub-negative electrode plates 220a and 220b may be more smooth. The liquid electrolyte may be an organic electrolyte prepared by dissolving a lithium salt in an organic solvent. However, the embodiments of the present invention are not limited thereto. For example, the liquid electrolyte may be any suitable material that can be utilized as a liquid electrolyte.

In other embodiments, if the secondary battery uses a solid electrolyte, the separator 230 may be formed of the solid electrolyte. That is, the solid electrolyte may function as a separator as well as an electrolyte. A boron oxide or a lithium oxynitride may be used as the solid electrolyte. However, the embodiments of the present invention are not limited thereto. For example, the solid electrolyte may be any suitable material that can be utilized as a solid electrolyte.

In some embodiments, the secondary battery may further include a lubricant which is a liquid type. When the liquid lubricant is disposed in the gap between the first and second sub-positive electrode plates 210a and 210b and/or the gap between the first and second sub-negative electrode plates 220a and 220b, the slip between the first and second sub-positive electrode plates 210a and 210b and/or the slip between the first and second sub-negative electrode plates 220a and 220b may be more smooth. A material having no influence on the operation of the secondary battery and not reacting with any constitutional material such as the active materials may be selected as the lubricant. For example, if the secondary battery is a lithium secondary battery, a non-aqueous carbonate solvent such as ethylene carbonate (EC), poly carbonate (PC), dimethyl carbonate (DMC), diethyl carbonate (DEC), or ethyl methyl carbonate (EMC) may be used.

Figure 5:
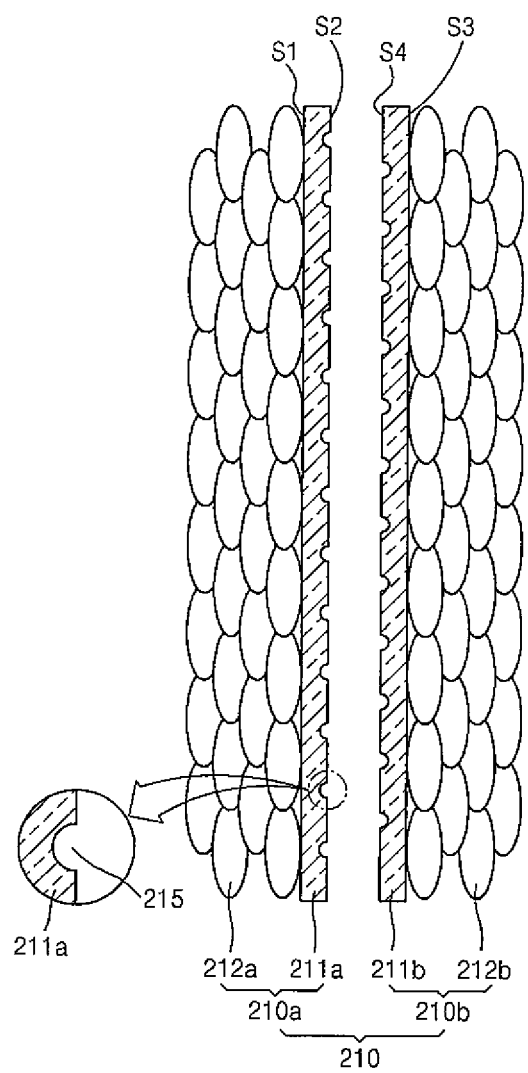
FIG. 5 is a view illustrating first and second sub-positive electrode plates according to another embodiment of the present invention.

FIG. 5 is a view illustrating first and second sub-electrode plates according to another embodiment of the present invention. In FIG. 5, for convenience of description, first and second sub-positive electrode plates 210a and 210b of a positive electrode plate 210 are illustrated.

Referring to FIG. 5, the first sub-positive electrode plate 210a is formed by coating a first positive electrode active material 212a onto a first surface S1 of a first positive electrode collector 211a, and the second sub-positive electrode plate 210b is formed by coating a second positive electrode active material 212b onto a third surface S3 of a second positive electrode collector 211b. Second and fourth surfaces S2 and S4 of the first and second positive electrode collectors 211a and 211b, which are non-coating surfaces of the first and second sub-positive electrode plates 210a and 210b, are disposed to face each other and slip relative to each other. The current embodiment is different in that the second and fourth surfaces S2 and S4 of the first and second positive electrode collectors 211a and 211b further include concave portions 215, as compared with the first and second sub-positive electrode plates 210a and 210b described with reference to FIGS. 2 and 3.

The concave portions 215 may be formed in the second surface S2 of the first positive electrode collector 211a and/or the fourth surface S4 of the second positive electrode collector 211b. The concave portions 215 may have a depth equal to or smaller than about 10% of the thickness of the first positive electrode collector 211a. For example, the concave portions 215 may have a depth of about 1 μm or smaller than 1 μm (e.g. a depth not greater than 1 μm) to accommodate a liquid electrolyte without a substantial influence on the slipping between the first and second sub-positive electrode plates 210a and 210b.

In the current embodiment, the first and second sub-positive electrode plates 210a and 210b further include the concave portions 215. However, the embodiments of the present invention are not limited thereto. For example, non-coating surfaces of first and second sub-negative electrode plates 220a and 220b may also include concave portions.

Figure 6:
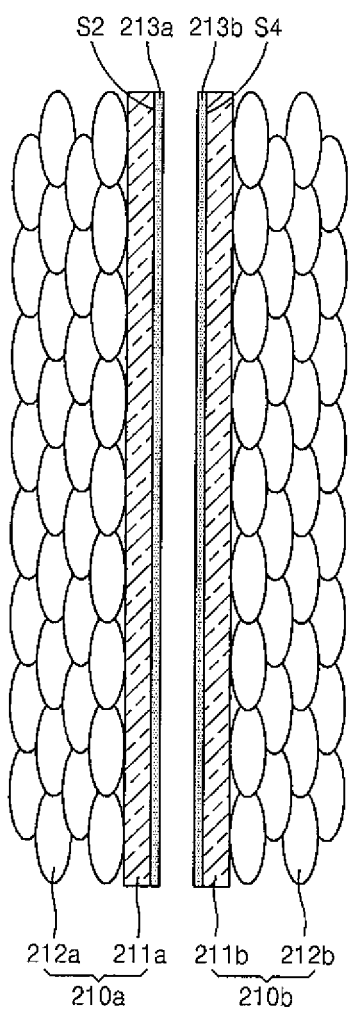
FIG. 6 is a view illustrating first and second sub-positive electrode plates according to another embodiment of the present invention.

FIG. 6 is a view illustrating first and second sub-electrode plates according to another embodiment of the present invention. In FIG. 6, for the convenience of description, first and second sub-positive electrode plates 210a and 210b of a positive electrode plate 210 are illustrated.

Referring to FIG. 6, non-coating surfaces of the first and second sub-positive electrode plates 210a and 210b may further include coating layers 213a and 213b. For example, a second surface S2 of a first positive electrode collector 211a and/or a fourth surface S4 of a second positive electrode collector 211b may respectively include the coating layers 213a and/or 213b. The coating layers 213a and 213b may include a fluorinated polymer such as polytetrafluoroethylene (PTFE), fluorinated ethylene propylene (FEP), or perfluoroalkoxy (PFA).

In the current embodiment, the first and second sub-positive electrode plates 210a and 210b further include the coating layers 213a and 213b. However, the embodiments of the present invention are not limited thereto. For example, first and second sub-negative electrode plates 220a and 220b may also include coating layers.

As described above, when a force is applied to bend or curve the secondary battery, the electrode assembly 200 is prevented from breaking or from deterioration of its electric characteristics because the first and second sub-positive electrode plates 210a and 210b are configured to slip between each other and the first and second sub-negative electrode plates 220a and 220b are configured to slip between each other. Particularly, as shown in FIG. 1, if the electrode assembly 200 is a stack type (i.e. a stacked) electrode assembly in which the positive electrode plate 210, the separator 230, and the negative electrode plate 220 are sequentially stacked, the first and second sub-positive electrode plates 210a and 210b and the first and second sub-negative electrode plates 220a and 220b may slip in various directions, and thus the electrode assembly 200 may have flexibility in any direction in which a force is applied thereto.

In the above-described embodiments, the electrode assembly 200 is a stack type electrode assembly in which the positive electrode plate 210, the separator 230, and the negative electrode plate 220 are sequentially stacked. However, embodiments of the present invention are not limited thereto.

In other embodiments of the present invention, the electrode assembly 200 may be a jelly-roll type (i.e. a jelly-rolled) electrode assembly in which the positive electrode plate 210, the separator 230, and the negative electrode plate 220 are sequentially stacked and then wound. In this case, the slip directions of the first and second sub-positive electrode plates 210a and 210b and the first and second sub-negative electrode plates 220a and 220b may be restricted as compared with the case where the electrode assembly 200 is a stacked type electrode assembly. However, if a force is applied in a direction perpendicular to the stacking direction of the positive electrode plate 210, the separator 230, and the negative electrode plate 220, the flexibility of the electrode assembly 200 may be improved due to the slipping of the first and second sub-positive electrode plates 210a and 210b and the slipping of the first and second sub-negative electrode plates 220a and 220b.

As described above, according to one or more embodiments of the present invention, the secondary battery may be flexible.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims and equivalents thereof.

What is claimed is:

1. A secondary battery comprising:
    a case; and
    an electrode assembly accommodated in the case and comprising a positive electrode plate, a negative electrode plate, and a separator between the positive and negative electrode plates,
    wherein at least one of the positive and negative electrode plates comprises:
    a first sub-electrode plate comprising a first coating surface coated with an active material and a first non-coating surface facing oppositely away from the first coating surface and not coated with the active material; and
    a second sub-electrode plate comprising a second coating surface coated with an active material and a second non-coating surface facing oppositely away from the second coating surface and not coated with the active material,
    wherein the first non-coating surface of the first sub-electrode plate faces the second non-coating surface of the second sub-electrode plate.

2. The secondary battery of claim 1, wherein at least one of the first and second non-coating surfaces is mirror polished.

3. The secondary battery of claim 1, further comprising a liquid electrolyte accommodated in the case.

4. The secondary battery of claim 3, wherein the liquid electrolyte is in a gap between the first and second non-coating surfaces.

5. The secondary battery of claim 3, wherein at least one of the first and second non-coating surfaces has at least one concave portion configured to accommodate the liquid electrolyte.

6. The secondary battery of claim 1, further comprising a coating layer formed on at least one of the first and second non-coating surfaces.

7. The secondary battery of claim 6, wherein the coating layer comprises a fluorinated polymer.

8. The secondary battery of claim 1, wherein the separator is formed of a solid electrolyte.

9. The secondary battery of claim 8, further comprising a liquid lubricant in a gap between the first and second non-coating surfaces.

10. A secondary battery comprising:
    a case; and
    an electrode assembly accommodated in the case and comprising a positive electrode plate, a negative electrode plate, and a separator between the positive and negative electrode plates,
    wherein at least one of the positive and negative electrode plates comprises:
    a first sub-electrode plate comprising a first sub-collector and an active material, the first sub-collector comprising a first surface coated with the active material and a second surface facing oppositely away from the first surface; and
    a second sub-electrode plate comprising a second sub-collector and an active material, the second sub-collector comprising a third surface coated with the active material and a fourth surface opposite to the third surface,
    wherein the second surface of the first sub-collector faces the fourth surface of the second sub-collector.

11. The secondary battery of claim 10, wherein roughness of the first surface is greater than that of the second surface.

12. The secondary battery of claim 10, wherein roughness of the third surface is greater than that of the fourth surface.

13. The secondary battery of claim 10, further comprising a liquid electrolyte accommodated in the case.

14. The secondary battery of claim 13, wherein at least one of the second surface of the first sub-collector and the fourth surface of the second sub-collector has at least one concave portion configured to accommodate the electrolyte.

15. The secondary battery of claim 10, further comprising a coating layer formed on at least one of the second surface of the first sub-collector and the fourth surface of the second sub-collector.

16. The secondary battery of claim 10, wherein the second surface of the first sub-collector and the fourth surface of the second sub-collector are configured to slip relative to each other.

17. The secondary battery of claim 10, wherein the separator is formed of a solid electrolyte.

18. The secondary battery of claim 10, further comprising a liquid lubricant in a gap between the second surface of the first sub-collector and the fourth surface of the second sub-collector.

19. The secondary battery of claim 10, wherein the electrode assembly is a stacked electrode assembly in which the positive electrode plate, the separator, and the negative electrode plate are sequentially stacked.

20. The secondary battery of claim 10, wherein the electrode assembly is a jelly-rolled electrode assembly in which the positive electrode plate, the separator, and the negative electrode plate are sequentially stacked and wound.

* * * * *